(12) United States Patent
Shapira et al.

(10) Patent No.: US 7,236,807 B1
(45) Date of Patent: Jun. 26, 2007

(54) CELLULAR BASE STATION AUGMENTATION

(75) Inventors: Joseph Shapira, Haifa (IL); Paul Lemson, Woodinville, WA (US)

(73) Assignee: Celletra Ltd., Yokneam Ilit (IL)

( * ) Notice: Subject to any disclaimer, the term of this patent is extended or adjusted under 35 U.S.C. 154(b) by 928 days.

(21) Appl. No.: 09/697,770

(22) Filed: Oct. 27, 2000

Related U.S. Application Data

(60) Provisional application No. 60/177,653, filed on Jan. 27, 2000, provisional application No. 60/161,918, filed on Oct. 28, 1999.

(51) Int. Cl.
*H04B 1/38* (2006.01)
*H01Q 3/01* (2006.01)

(52) U.S. Cl. ............... 455/562.1; 455/273; 455/101; 342/372

(58) Field of Classification Search ......... 455/562.1, 455/561, 115.3, 101, 272, 273, 334, 339, 455/341; 342/373, 375
See application file for complete search history.

(56) References Cited

U.S. PATENT DOCUMENTS

| | | | | |
|---|---|---|---|---|
| 4,520,476 A | * | 5/1985 | Searl ..................... | 370/278 |
| 5,068,629 A | * | 11/1991 | Nishikawa et al. ......... | 333/1.1 |
| 5,115,463 A | | 5/1992 | Moldavsky et al. | |
| 5,533,011 A | | 7/1996 | Dean et al. | |
| 5,714,957 A | * | 2/1998 | Searle et al. ............... | 342/374 |
| 5,923,303 A | | 7/1999 | Schwengler et al. | |
| 5,970,061 A | | 10/1999 | Kokudo | |
| 6,256,356 B1 | | 7/2001 | Suzuki | |
| 6,275,484 B1 | | 8/2001 | Lynch et al. | |
| 6,329,880 B2 | * | 12/2001 | Akiya ..................... | 330/298 |
| 6,337,607 B1 | * | 1/2002 | Genfan ................... | 333/1.1 |
| 6,347,234 B1 | | 2/2002 | Scherzer | |
| 6,411,824 B1 | * | 6/2002 | Eidson ..................... | 455/561 |
| 6,640,110 B1 | * | 10/2003 | Shapira et al. ............ | 455/562.1 |

FOREIGN PATENT DOCUMENTS

| | | |
|---|---|---|
| EP | 0 766 414 A1 | 4/1997 |
| GB | 2 290 006 | 12/1995 |
| WO | WO97 44983 | 11/1997 |
| WO | WO98 11626 | 3/1998 |
| WO | WO98 39851 | 9/1998 |

* cited by examiner

*Primary Examiner*—Edward F. Urban
*Assistant Examiner*—Blane J. Jackson

(57) ABSTRACT

A system and method of augmenting existing and operational base stations to include multiple diversity schemes and to render passive antenna elements active is presented herein. The passive antenna array of the existing base station is replaced with an active antenna array, consisting of an active radiator unit that includes an array of both receive and transmit antenna elements. The transmit and receive antenna elements of the active radiator unit, respectively, are connected to transmit amplifiers and bandpass filters located at a masthead or at the top of the building.

7 Claims, 8 Drawing Sheets

CELLULAR BASE STATION AUGMENTATION

RELATED APPLICATION DATA

Priority is hereby claimed to U.S. provisional Patent Application No. 60/161,918, entitled "Cellular Base Station Augmentation and Method," filed Oct. 28, 1999, and U.S. provisional Patent Application No. 60/177,653, entitled "Cellular Base Station Augmentation and Method," filed Jan. 27, 2000, the content of each of which is hereby expressly incorporated by reference herewith in its entirety.

BACKGROUND OF THE INVENTION

1. Reservation of Copyright

This patent document contains material which is subject to copyright protection. The copyright owner has no objection to the facsimile reproduction by anyone of the patent document or the patent, as it appears in the U.S. Patent and Trademark Office patent files or records, but otherwise reserves all copyright rights whatsoever.

2. Field of the Invention

The present invention, in certain respects, relates to wireless communication systems. Other aspects of the invention relate to systems and methods for augmenting existing cellular base station systems and for implementing cellular base station systems.

3. Description of Background Information

Existing and operational base stations for cellular and personal communication systems (PCS) typically comprise antenna arrangements located at the top of a mast or building. Some of these antenna arrangements utilize diversity antennas arrangements to enhance the performance of the base station by, e.g., combating the deleterious effects of multi-path propagation, such as multi-path fading and dispersion. The types of diversity employed may include, e.g., one or a combination of space diversity, phase diversity, frequency diversity, polarization diversity, and time diversity. Some of those existing/operational antenna arrangements may include a first (main) antenna array of co-located antenna elements and a second (diversity) antenna array (or individual antenna element) located at a distance from the first antenna array. The main antenna array may include antenna elements serving as both transmit and receive antennas. The diversity antenna array may include only receive antenna elements. Either or both the main antenna array and the diversity antenna array may be passive in that the antenna elements are not coupled to proximate amplifiers also provided at the top of the mast/building.

Thus, there is a need to augment existing base station antenna setups such as these. For example, existing/operational base stations would benefit by rendering their receive antenna elements active, i.e., by installing low noise amplifiers (LNA) at the top of the mast of a building, rather than only at the bottom of the mast or building. Alternatively or in conjunction with the installation of the LNAs, the transmit elements may be rendered active by installing linearized power amplifiers (LPA) positioned also at the top a building. This will provide certain advantages, including reducing cabling and power consumption costs associated with carrying signals up and down the mast or building. These base station antenna setups may also need augmentation or modification to facilitate a change in cellular technologies, e.g., adding code division multiple access (CDMA) capabilities to a base station using the Advance Mobile Phone Service (AMPS) or Global System for Mobile (GSM) standard or changing the base station altogether for use in a new scheme, e.g., CDMA.

There is also a need to add antenna functionality (e.g., to accommodate new cellular technologies and/or to enhance performance over the forward and reverse links) without adding antenna arrays that may take up additional space, or be considered as additional antenna arrangements (which may be a violation of local laws, regulations or ordinances).

There is a further need for novel and beneficial ways of addressing these issues, and others, in the implementation of cellular base station systems, and more particularly in the implementation of communication sites serving limited coverage areas, such as cells and sectors.

SUMMARY OF THE INVENTION

The present invention is provided to improve upon wireless communications systems. More specifically, the present invention is provided to facilitate the augmentation of cellular base station systems, e.g., improving the transmit and/or receive performance of a given base station (and its associated cell or sector) and/or providing new cellular technology (e.g., CDMA) capabilities to an existing base station.

An embodiment is directed to a system and method or one or more components thereof. In accordance with such a method or system, an existing and operational base: station (serving a given cell or sector) has a main antenna array and a passive (space) diversity array. The passive diversity antenna array is replaced with an active radiator unit, including an array of both receive and transmit antenna elements. The transmit and receive antenna elements, respectively, are connected (at a masthead, or at the top of a building) to amplifiers and bandpass filters.

The receive antenna elements of the active radiator unit may comprise sets of receive antenna elements having diverse polarizations, in which case the resulting modified antenna arrangement will have dual diversity for forward link communications—space diversity (due to the spacing between the main antenna array and the new active radiator unit) and polarization diversity (due to the polarization diversity among members of the sets of receive antenna elements within the active radiator unit). In general, space diversity involves physically separating the antennas by a defined physical separation, which can be either horizontal or vertical. Polarization diversity involves utilizing two different antenna elements that are polarized in different (e.g., orthogonal) planes.

The existing and operational antenna arrangement may be adaptable for a CDMA cellular system, having no diversity on the forward link (base station to mobile) along with space diversity on the reverse link (mobile to base station). Once the diversity antenna array (which may comprise only receive antenna elements) is replaced with a new active antenna element array, comprising transmit as well as receive antenna elements, the resulting antenna assembly will have transmit diversity on the forward link due to space diversity. In addition, there may be a gain in the effective isotropic radiated power (EIRP) over the forward link due to the fact that the transmit antenna elements are now provided with power amplifiers at the mast head/building top.

Since many base stations currently employ already installed and operational systems, augmentation can preserve existing infrastructure while increasing the performance and/or the functionality of the base station. For example, existing and operational base stations may already be configured to operate within the AMPS or GSM standard. A space diversity antenna array of such a base station may be replaced to provide an antenna arrangement that can accommodate a new cellular communications scheme (e.g., CDMA) in addition to the existing scheme (e.g., AMPS or GSM) or instead of the existing scheme. Where the old scheme and the new scheme coexist for a given base station (e.g., as a result of replacing a passive receive antenna array with a new active transmit/receive antenna array), the active diversity array can serve as the transmit and receive elements serving the new scheme, while the main array continues to serve the old scheme.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein.

DETAILED DESCRIPTION

Various details concerning the antenna, assemblies, elements and arrays used in the embodiments disclosed herein (and other details pertinent to features and components disclosed herein) are described in commonly-assigned copending application Ser. No. 09/357,844, filed Jul. 21, 1999 and Ser. No. 09/357,845, filed Jul. 21, 1999, the content of each of which is hereby incorporated by reference herein in its entirety.

Existing base station antenna arrangements may utilize receive diversity antenna arrays, e.g., to combat the adverse effects of multi-path propagation, and many such antenna arrangements may comprise passive antenna elements that would benefit from being rendered active, e.g., to improve performance and/or to accommodate new standards. Such arrangements would also benefit from enhanced/additional types of diversity, which also can help to improve performance and accommodate new standards.

Figure 1:
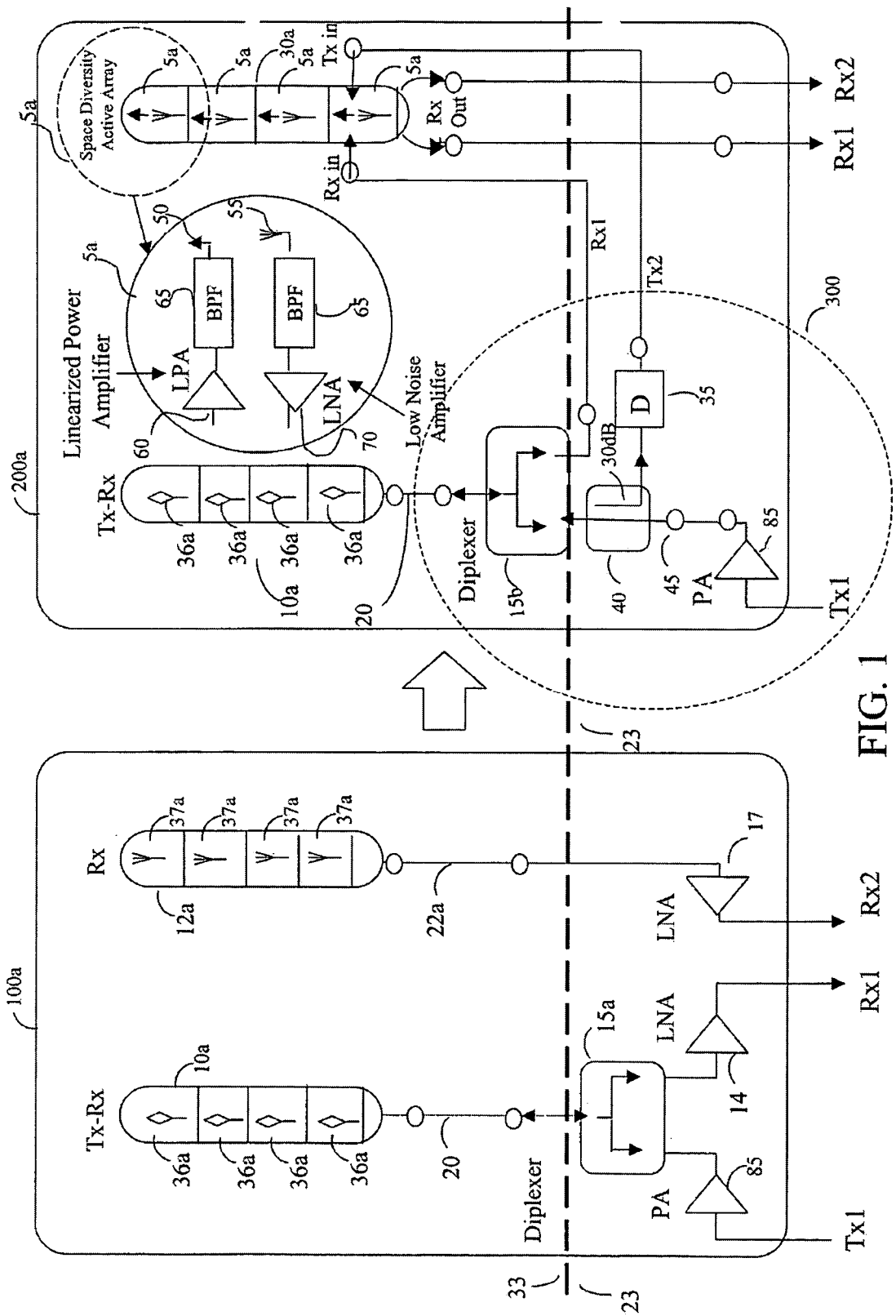
FIG. 1 shows one illustrative augmentation method where an existing space diversity antenna arrangement of a base station having no transmit diversity is converted to a new antenna arrangement having receive (Rx) space diversity antenna elements and transmit (Tx) space diversity antenna elements for use, e.g., in CDMA applications.

An existing base station antenna arrangement may be augmented by adding a new antenna array and/or replacing an existing antenna array with a new antenna array. FIGS. 1–6 illustrate various embodiments of such augmentations of existing base station antenna arrangements 100a–e with a new antenna array 30a–e. The new antenna array 30a–e may comprise an active antenna array, which includes an active radiator unit 5a or 5b having both receive and transmit antenna elements. By way of example, the circled portion 5a shown in FIG. 1 depicts an exemplary structure of the active radiator unit 5a that may be utilized in the active antenna arrays 30a–c of FIGS. 1–3. Similarly, FIG. 6 depicts an exemplary structure of the active radiator units 5b that may be employed in the active antenna arrays 30d–e of FIGS. 4 and 5.

FIG. 1 illustrates an augmentation method that modifies an existing base station antenna arrangement 100a, which comprises a main antenna array 10a and a secondary antenna array 12a, by replacing the secondary antenna array 12a with a new antenna array 30a, which may be active or passive. Namely, augmentation of the base station in FIG. 1 converts an existing space diversity antenna arrangement of a base station, having no transmit diversity, to an augmented antenna array 200a having receive space diversity antenna elements and transmit time diversity.

Initially, the existing base station antenna arrangement 100a includes a main antenna array 10a, having a plurality of antenna elements each of which serves as a common single antenna element 36a that permits transmission and reception over the same antenna element. A single cable 20 extends from the main antenna array 10a, which is located at the top of a building 33, and connects to a diplexer 15a, which is located below the top of the mast/building 23. The diplexer 15a serves as a coupler that allows the simultaneous transmission and reception of two signals using the common single antenna elements 36a of the main antenna array 10a. To transmit a signal from the base station to a mobile unit (not shown) along the forward link, the base station transceiver subsystem (not shown) sends a transmit signal via transmission cable Tx1 through a power amplifier 85 to an input terminal of the diplexer 15a. The diplexer 15a then sends the transmit signal over a cable 20 to the main antenna array 10a where the transmit signal is radiated to the mobile unit (not shown). When the mobile uit transmits a signal to the base station along the reverse link, the receive signal arrives at the common single antenna elements 36a, which then sends the receive signal to the diplexer 15a via cable 20. The diplexer 15a transmits the receive signal to the base station transceiver subsystem (not shown) by directing the signal over the receive line Rx1 and through a LNA.

In the embodiment of FIG. 1, the secondary antenna array 12a includes a space diversity antenna array, having only receive elements 37a. However, the scope of the embodiment of FIG. 1 is not limited to this exemplary arrangement. Other types of secondary antenna array arrangements may be employed alone or in combination, such as a Tx only diversity antenna array, a Rx only diversity antenna array or a Tx-Rx diversity antenna array.

Within the existing base station antenna arrangement 100a of FIG. 1, a single cable 22 extends from the secondary antenna array 12a, which is located at the top of a building 33, to a LNA 17, which is located below the top of the mast/building 23. The single cable 22a further extends from the LNA 17 in the direction of reception cable Rx2 to the receive input terminal of the base station transceiver subsystem (not shown). As shown in FIG. 1, the secondary antenna array 12a may be passive in that the antenna elements are not coupled to proximate amplifiers provided at the top of the mast/building. In fact, in FIG. 1, both the main antenna array 10a and the secondary antenna array 12a are passive. Thus, it is within the scope of the embodiment of FIG. 1 that either or both the main antenna array 10a and the secondary antenna array 12a may be passive.

In FIG. 1, in order to convert the existing base station antenna arrangement 100a to an augmented antenna array 200a, several modifications are made to the secondary antenna array 12a and to the section of the main antenna array 10a located below the top of the mast/building 23. Modifications to the secondary active antenna array 12a include replacing the secondary antenna array 12a with a new antenna array 30a, which may be either active or passive. In this embodiment of FIG. 1, the newly added antenna array 30a comprises an active antenna array, which includes an active radiator unit 5a having both receive 55 and transmit 50 antenna elements, (as disclosed in U.S. application Ser. No. 09/357,845). The transmit 50 and receive 55 antenna elements connect at the masthead or at the top of the building to amplifiers 60, 70 by way of bandpass filters 65. As shown in the circled portion 5a of FIG. 1, by way of example, the transmit antenna elements 50 connects to a LPA and a bandpass filter 65, and the receive antenna element 55 connects to a LNA 70 and a bandpass filter 65. Although FIG. 1 illustrates the new antenna array as having four active radiator units 5, this embodiment is not the limited to the exemplary configuration as shown.

In order to provide additional diversity schemes to the embodiment of FIG. 1, the augmentation method also modifies the lower portion of the main antenna array 10a. In FIG. 1, comparing the existing base station antenna arrangement 100a to the augmented antenna array 200a, a modification, which occurs at the lower portion of the main antenna array 10a, relocates the diplexer 15a from its original position, below the top of the mast/building 23 to a relocated position at the top of the building 33. The connection, from the base station transceiver subsystem (not shown) to the relocated diplexer 15b via transmission cable Tx1, changes to include a directional coupler 40 added between the power amplifier 85 and the relocated diplexer 15b. The directional coupler 40 serves as a directive feed that couples the main antenna 10a and new antenna array 30a. As the base station transceiver subsystem (not shown) transmits a signal via the transmission cable Tx1 to the transmit elements of the common single antenna element 36a of the main antenna array 10a, the directional coupler 40 obtains a sample of the transmit signal before the main antenna array 10a radiates the signal along the forward link to a mobile unit (not shown). The directional coupler 40 then sends the sample of the transit signal to a delay unit 35 by way of cable Tx2. The delay unit 35 facilitates transmit time diversity within the augmented antenna array 200a by sending, at least one or more time-delayed copies of the sample of the signal to the transmit elements 50 of the new antenna array 30a, at connection point Tx in, for broadcasting the copy signal to mobile units.

Any passive element of the main antenna array 10a may also be rendered active by connecting the output terminal of the relocated diplexer 15b to a new antenna array 30a, which is active. The connection between the output terminal of the diplexer 15a and the base station, also changes during the augmentation process. Instead of traveling directly to the base station as shown in the existing base station antenna arrangement 100a, in the augmented antenna array 200a, the receive signal now travels from the relocated diplexer 15b to the receive elements 55 of the new antenna array 30 via reception cable Rx1 and enters the new antenna array 30a at connection point Rx in. Then, all signals received at the new antenna array 30 exit the new antenna array 30 and travel to the base station transceiver subsystem (not shown) via reception cables Rx1 and Rx2.

Augmentation of the existing base station antenna arrangement 100a provides several benefits to the augmented antenna array 200a of FIG. 1. For example, the augmentation may be implemented within the same dimensions as the existing base station antenna arrangement 100a. In other words, the space required to implement the augmentations encompasses approximately the same amount of space as the existing base station antenna arrangement 100a. Thus, implementation of the augmented antenna array does not require any additional space. This is an important benefit because it adds antenna functionality within an existing base station without adding antenna arrays that may take up additional space or be considered as additional antenna arrangements, which may be a violation of local laws, regulations or ordinances.

Another benefit gained from augmenting the existing base station is the ability to provide a relatively effortless method of incorporating multiple types of diversity schemes. For example, in the augmented antenna array 200a of FIG. 1, the configuration includes at least two types of diversity—space diversity and transmit time diversity. The spacing between the main antenna 10a and the new antenna array 30a creates space diversity. Meanwhile, the directional coupler 40 and delay unit 35 helps to facilitate time transmit diversity, as discussed above. By augmenting the base station to include transmit diversity, the need for space diversity in the mobile unit becomes unnecessary, and, as a result, miniaturization of the mobile unit can be realized.

In FIG. 1, a further benefit derived from the augmentation of the base station includes cost reductions, which inherently flow from rendering the passive receive diversity antenna array 12a and any passive elements of the main antenna array 10a of the existing base station antenna arrangement 100a to be active antenna arrays This is achieved by installing amplifiers 60, 70 and bandpass filters 65 at the top of the mast of the building, rather than only at the bottom of the mast or the building. By rendering the passive antenna array to be active, this augmentation decreases the power consumption cost and cabling cost.

Figure 2:
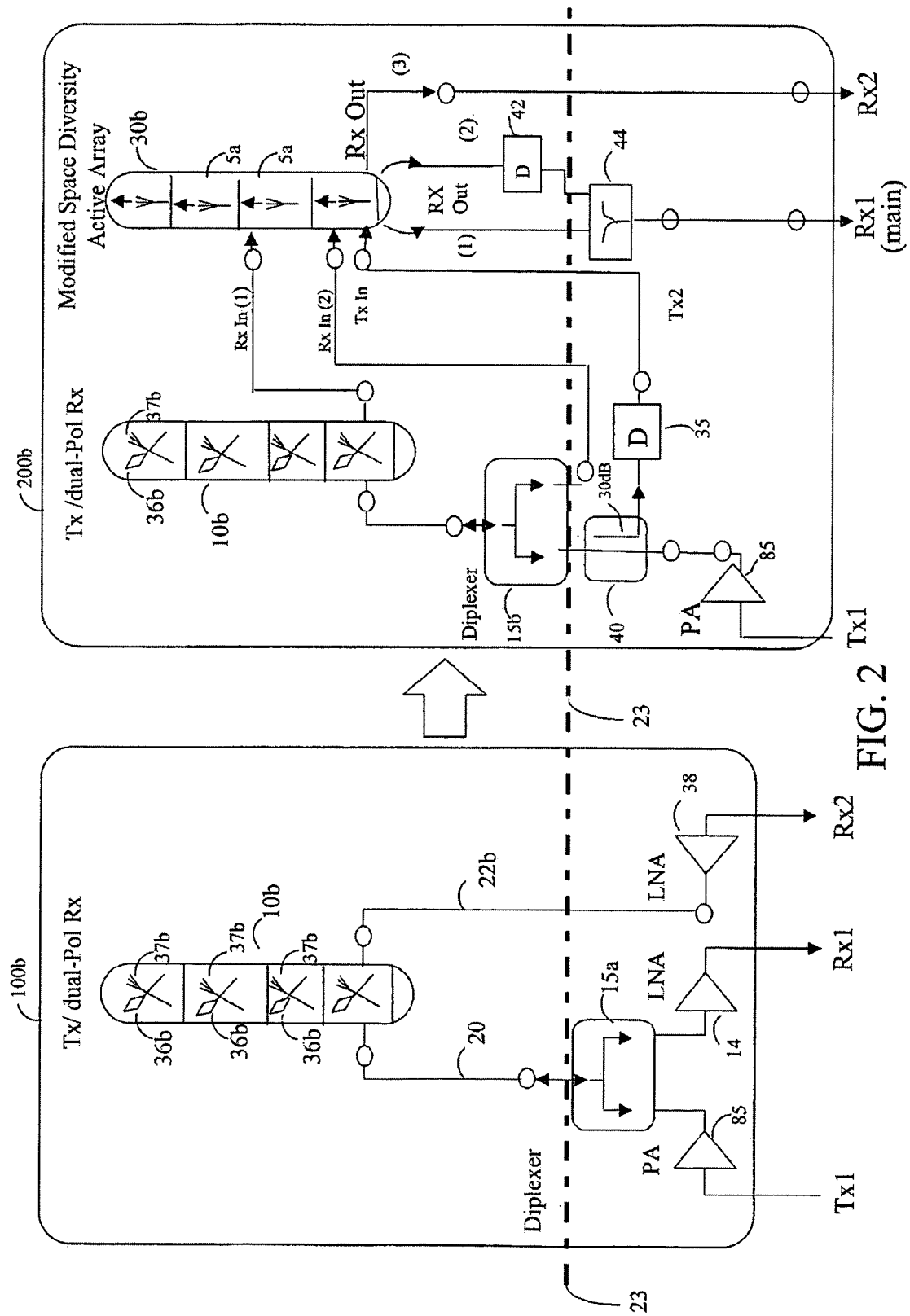
FIG. 2 shows an illustrative augmentation method where an existing antenna arrangement having Rx polarization diversity but no transmit diversity is converted to a new antenna arrangement having polarization diversity, Rx space diversity elements and Tx and Rx time diversity elements, for use, e.g., in CDMA applications.

FIG. 2 illustrates an augmentation method that converts an existing antenna arrangement 100b, having receive polarization diversity but no transmit diversity, to an augmented antenna array 200b, having polarization diversity, Rx space diversity elements and Tx and Rx time diversity elements in two separate antenna arrays. The augmentation of FIG. 2 involves adding a new antenna array 30b, which may be active or passive, to the existing base station antenna arrangement 100b, having receive polarization diversity. Similar to FIG. 1, the existing base station antenna arrangement 100b of FIG. 2 comprises a transmission cable Tx1, a power amplifier 85, diplexer 15a, LNA 14, and reception cable Rx1. These components are generally connected in the same fashion as the components of FIG. 1, and, they may be implemented in the same fashion as the components of FIG. 1. Thus, a specific discussion of these components will not be provided herein.

However, there are three notable differences in the existing base station antenna arrangement 100b of FIG. 2, in comparison to the existing base station antenna arrangement 100a of FIG. 1. The first difference is that the main antenna array 10b of FIG. 2 comprises a dual diversity antenna array including a receive space diversity antenna array and a polarization diversity antenna array. In this exemplary embodiment of FIG. 2, the polarization diversity antenna array contains a plurality of antenna elements each of which includes a common single antenna element 36b and a receive element 37b. However, the scope of FIG. 2 is not limited only to the types of diversity shown in the exemplary embodiment. Other combinations of multiple diversity schemes may be utilized, for example, time diversity, frequency diversity and/or phase diversity.

The second difference of the existing base station antenna arrangement 100b of FIG. 2, compared to the existing base station antenna arrangement of FIG. 1, is that FIG. 2 does not include a secondary antenna array 12a. The third difference of the existing base station antenna arrangement is the addition of a reception cable Rx2 extending from the main antenna array 10b and traveling through a LNA 85 to the base station transceiver subsystem (not shown).

Augmentation of the existing base station antenna arrangement 100b of FIG. 2, which includes a Rx polarization diversity antenna array but no transmit diversity, provides an augmented antenna array 200b, having Rx polarization diversity, Rx space diversity elements and Tx and Rx time diversity elements. In order to augment the existing base station antenna arrangement 100b in FIG. 2, several modifications, e.g., relocating the diplexer 15b at the top of the mast/building within the antenna arrangement and adding a directional coupler 40 and a delay unit 35 to the antenna arrangement, connect in the same fashion as shown in the circled portion 300 of FIG. 1. As a result, the operation of these components may be implemented in the same fashion as the components of FIG. 1. Thus, in the interest of brevity, discussion of these modifications will not be reiterated.

The passive elements of FIG. 2, like FIG. 1, may also be rendered active. However, since the existing base station antenna arrangement 100b does not include a secondary antenna array 12a, one notable difference between the modifications of FIGS. 1 and 2 is that instead of replacing an existing antenna array with a new antenna array, the modification of FIG. 2 involves the addition of a new antenna array 30b. Nevertheless, the configuration of the new antenna array 30b, which may comprise a passive antenna array or an active antenna array 5a, remains substantially the same as the embodiment of FIG. 1.

Another modification of the augmented antenna array 200b of FIG. 2, includes changing the path that the receive signals travel to arrive at the base station transceiver subsystem (not shown). This augmentation to the travel path facilitates the addition of various diversity schemes within the augmented antenna array 200b. To facilitate Rx time diversity, the augmentation method provides within the travel path of received signals a combiner 44 and a delay unit 42 downstream of the main antenna array 10b and the new antenna array 30b. When the mobile unit transmits a signal to the base station transceiver subsystem (not shown), the receive elements of the main antenna array 10b and the receive elements of the new antenna array 30b intercept the receive signals and send the receive signals to the base along the respective reception path of the main antenna array 10b and the new antenna array 30b. The travel path of the cable extending from the main antenna array 10b feeds directly into the new antenna array 30b by way of reception cable Rx In(1). Receive signals may also travel through the relocated diplexer 15(b) along the reception path Rx In(2) to the new antenna array 30d. Once the receive signals enter the new antenna array 30b, the signals may exit through several different routes, e.g., Rx Out (1), (2) and (3). The delay unit 42, within the travel path of Rx Out(1) and (2), collects the received signals to perform a diversity analysis on the characteristics of the receive signals. Then, the combiner 44, located within the reception cable Rx1, combines the receive signals transmitted over the reception cables Rx Out (1) and (2) to the base station transceiver subsystem (not shown). Alternatively or in conjunction with the reception cable Rx1, the receive signals may travel from the new antenna array 30b to the base station transceiver subsystem (not shown) via reception cable Rx2.

In the augmented antenna array 200b of FIG. 2, the addition of the directional coupler 40 and the delay unit 35 provides Tx time diversity, as discussed with respect to FIG. 1. Thus, the augmented antenna array 200b is capable of providing Tx and Rx time diversity on the main antenna array 10b. The spacing between the main antenna 10b and the new antenna array 30b creates space diversity, and the polarization diversity among the members of the set of elements within the main antenna array 10b facilitates polarization diversity.

In sum, augmenting FIG. 2 also enhances the antenna arrangement by providing multiple types of diversity to an existing base station antenna arrangement 100b. Augmentation of FIG. 2 further reduces the cost of operation by rendering a passive antenna array to be an active antenna array.

Figure 3:
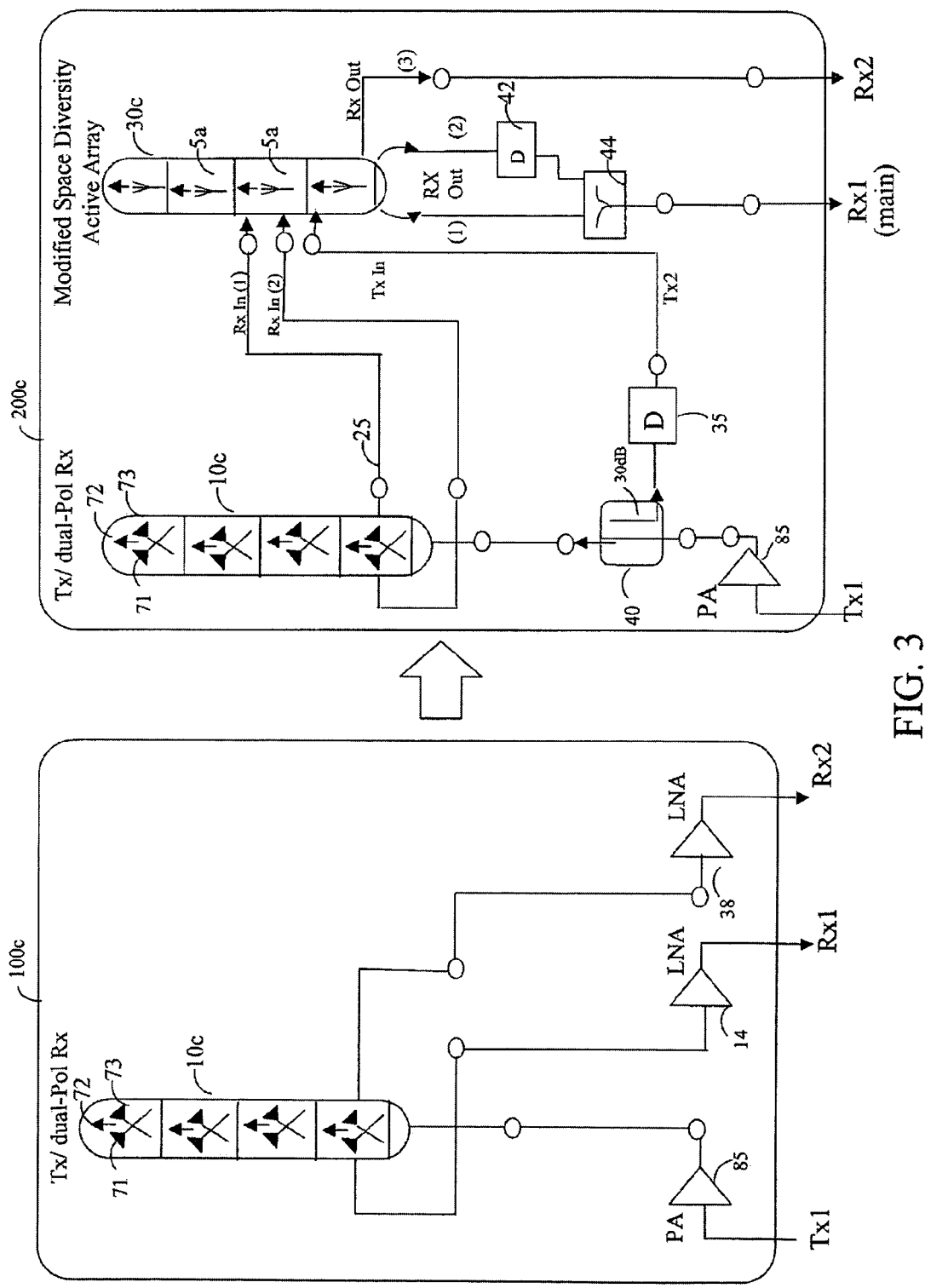
FIG. 3 shows an illustrative augmentation method where an existing antenna arrangement having Rx polarization diversity configuration and no Tx diversity is converted to a new antenna arrangement having Tx and Rx space diversity, Tx and Rx time diversity, and Rx polarization diversity for use, e.g., in CDMA applications.

Referring to the existing base station antenna arrangement 100c of FIG. 3, instead of sending the receive and transmit signals over a common antenna element as accomplished in FIG. 2, the main antenna array 10c of FIG. 3 provides separate transmit and receive elements 71, 72, and 73 for the respective transmit and receive signals. Furthermore, since FIG. 3 does not contain a diplexer, as shown in FIG. 1, a transmit signal flowing from the base station transceiver subsystem (not shown) to the transmit element of the main antenna array 10c passes through power amplifier 85 as the signal travels along transmission cable Tx1. With regards to signals received at the main antenna array 10c, the receive signals travel from the receive elements of the main antenna array 10c pass through a LNA 14, and flow to the base station transceiver subsystem (not shown), by way of reception cable Rx1. A second reception cable Rx2, extend from the main antenna array 10c so that the receive signals travel through a LNA 17 and continue to the base station. It is further noted that the existing base station antenna arrangement 100c of FIG. 3, like FIG. 2, does not include a secondary antenna array, as shown in FIG. 1.

The augmentation method of FIG. 3 modifies an existing antenna arrangement having Rx polarization diversity configuration and no Tx diversity by adding a new antenna array 30c, having Tx and Rx space diversity, Tx and Rx time diversity, and Rx polarization diversity. The augmentation of FIG. 3 is implemented in a manner similar to the modifications of FIG. 2. The modifications of adding the new antenna array 30c and the travel path over the reception cables Rx Out (1), (2) and (3) connect in the same manner and operate in the same manner as the components of FIG. 2. Therefore, these modifications will not be specifically discussed, in the interest of brevity.

In order to render any passive elements of the main antenna array 10*c* active, the augmentation method of FIG. 3 provides a transmission cable Tx2 and reception cables Rx In (1) and (2), respectively, extending from the main antenna array 10*c* to the base station transceiver subsystem (not shown), to accommodate the separate Tx and Rx elements of the main antenna array 10*c*. The transmission cable Tx2 extends from the main antenna array 10*c* through the directional coupler 40 and the delay unit 35 to the new antenna array 30*c*. The reception transmission cables Rx In (1) and (2) extend directly, from the main antenna array 10*c*, to the new antenna array 30*c*.

In addition, a variety of multiple diversity schemes may be implemented by the augmented antenna array 200*c*. To facilitate Tx time diversity, a directional coupler 40 serves as a directive feed that couples the main antenna 10*c* and new antenna array 30*c*. As the base station transceiver subsystem (not shown) transmits a signal via the transmission cable Tx1 to the transmit elements of the main antenna array 10*c*, the directional coupler obtains a sample of the transmit signal before the main antenna array 10*c* radiates the signal along the forward link to a mobile unit (not shown). The directional coupler 40 then sends the sample of the signal to a delay unit 35. The delay unit 35 facilitates transmit time diversity within the augmented antenna array 200*c* by sending, by way of cable Tx2, at least one or more time-delayed copies of the sample of the signal to the transmit elements of the new antenna array 30*c*, at connection point Tx In, for broadcasting the copy signal to mobile units.

To implement Rx time diversity, the augmentation method provides within the travel path of received signals a combiner 44 and a delay unit 42 downstream of the main antenna array 10*c* and the new antenna array 30*c*. When a mobile unit transmits a signal to the base station transceiver subsystem (not shown), the receive elements of the main antenna array 10*c* and the new antenna array 30*c* intercept the receive signals and sends the receive signals to the base along the respective reception path of the main antenna array 10*c* and the new antenna array 30*c*. The travel path of the cables Rx In(1) and (2) extends from the main antenna array 10*c* of the existing base station antenna arrangement 100*c* and feeds directly into the new antenna array 30*c*. Once the receive signals enter the new antenna array 30*b*, the signals may exit through several different routes, e.g., Rx Out (1), (2) and (3). The delay unit 42 within the travel path delays the received signal to provide time diversity in the receive signals. Then, the combiner 44, located within the reception cable Rx1, combines the receive signals transmitted over the reception cables Rx Out (1) and (2) and transmit the combined signal to the base station transceiver subsystem (not shown).

To facilitate space diversity, the spacing between the main antenna 10*c* and the new antenna array 30*b* creates space diversity, and the polarization diversity among the members of the set of elements within the main antenna array 10*c* facilitates polarization diversity.

Like FIG. 2, the augmentation of FIG. 3 provides the ability to enhance an existing antenna arrangement by incorporating multiple types of diversity schemes and provides cost reduction benefits by rendering any passive antenna element active.

Figure 4:
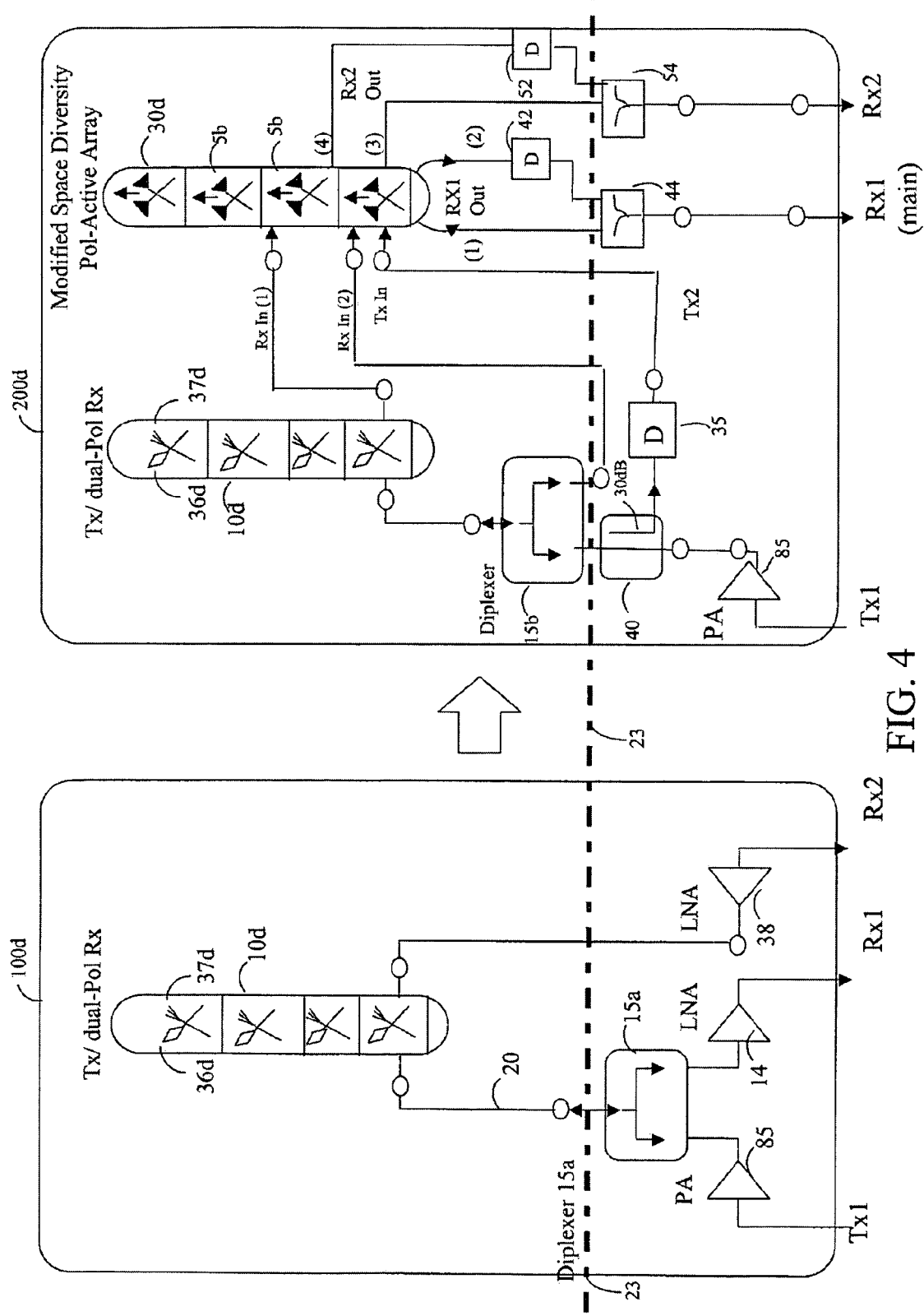
FIG. 4 shows an illustrative augmentation method where an existing antenna arrangement having Rx polarization diversity configuration, which uses a subset of its elements for both Tx and Rx, without transmit diversity, is converted to a new antenna arrangement having Tx and Rx space diversity, Tx and Rx time diversity, and Rx polarization in two separated antenna arrays.

In FIG. 4, all of the components of the existing base station antenna arrangement 100*d* connect in the same manner and operate in the same manner as the components shown in FIG. 2. Thus, the existing base station antenna arrangement 100*d* of FIG. 4 will not be specifically discussed.

FIG. 4 illustrates an augmentation method that modifies an existing base station antenna arrangement 100*d* by adding a new antenna array 30*d*. Augmentation of the base station of FIG. 4 converts an existing base station antenna arrangement 100*d*, having Rx polarization diversity configuration and no Tx diversity, to an augmented antenna array 200*d*, having Tx and Rx space diversity, Tx and Rx time diversity and Rx polarization in two separate antenna arrays.

Compared to the augmentation method of FIGS. 1–3, the augmentation method of FIG. 4 provides an even wider variety of diversity schemes by adding a different type of new antenna array 30*d*. The newly added antenna array 30*d* may contain either an active or passive antenna array. FIG. 6 illustrates an exemplary embodiment of an active radiator unit 5*b*, (as disclosed in U.S. application Ser. No. 09/357,845) which may be employed in an active antenna array according to the embodiment of FIG. 4. The active antenna array 5*b* of FIG. 6 includes both transmit and polarization diversity elements.

To facilitate the various exemplary diversity schemes of FIG. 4, the spacing between the Tx elements of the main antenna array 10*d* and the Tx elements of the new antenna array 30*d* provides Tx space diversity. Likewise, the spacing between the Rx elements of the main antenna array 10*d* and the Rx elements of the new antenna array 30*d* provides Rx space diversity.

To implement Tx time diversity, a directional coupler 40 serves as a directive feed that couples the main antenna 10*d* and new antenna array 30*d*. As the base station transceiver subsystem (not shown) transmits a signal via the transmission cable Tx1 to the transmit elements of the main antenna array 10*d*, the directional coupler obtains a sample of the transmit signal before the main antenna array 10*d* radiates the signal along the forward link to a mobile unit (not shown). The directional coupler 40 then sends the sample of the signal to a delay unit 35. The delay unit 35 facilitates transmit time diversity within the augmented antenna array 200*d* by sending, by way of cable Tx2, at least one or more time-delayed copies of the sample of the signal to the transmit elements of the new antenna array 30*d*, at connection point Tx In, for broadcasting the copy signal to mobile units.

To implement Rx time diversity, the augmentation method provides within the travel path of received signals a pair of combiners 44, 54 and a pair of delay units 42, 52 downstream of the main antenna array 10*d* and the new antenna array 30*d*. When a mobile unit transmits a signal to the base station transceiver subsystem (not shown), the receive elements of the main antenna array 10*d* and the new antenna array 30*d* intercept the receive signals and send the receive signals to the base along the respective reception path of the main antenna array 10*d* and the new antenna array 30*d*. The travel path of the Rx In(1) cable extends from the main antenna array 10*d* and feeds directly into the new antenna array 30*c*. Receive signals may also travel through the relocated diplexer 15*b* along reception path Rx In(2) to the new antenna array 30*d*. Once the receive signals enter the new antenna array 30*d*, the signals may exit through several different routes, e.g., Rx1 Out (1) and (2) and Rx2 Out (3) and (4). The delay units 42, 52 within the travel path of the respective reception lines delay the receive signals to provide time diversity. Then, the combiners 44, 54, located within the reception cables Rx1 and Rx2, respectively, combine the receive signals and transmit the receive signals to the base station transceiver subsystem (not shown).

Furthermore, the polarization diversity configurations of the elements of both the main antenna array 10d and new antenna array 30d provide Rx polarization diversity schemes.

Consequently, augmentation of FIG. 4 also provides additional benefits to the base station, such as the incorporation of multiple types of diversity schemes within an existing and operating base station. For example, the augmented antenna array 200d of FIG. 4 is capable of providing, at least, Tx and Rx space diversity, Tx and Rx time diversity and Rx polarization diversity in two separate antenna arrays. However, the embodiment of FIG. 4 is not limited to the exemplary embodiment, various other diversity schemes may be employed, such as phase diversity and frequency diversity. Moreover, the cost of operating the base station also decreases when the augmentation renders a passive antenna array to be an active antenna array. Installation of an active antenna array helps to alleviate the cost associated with the power consumptions of the base station and reduces the amount of cabling required within the base station since the length of capable needed to connect the component is shorter due to the fact that the amplifiers and bandpass filters associated with each active antenna array are also located at the top of the mast/building.

Figure 5:
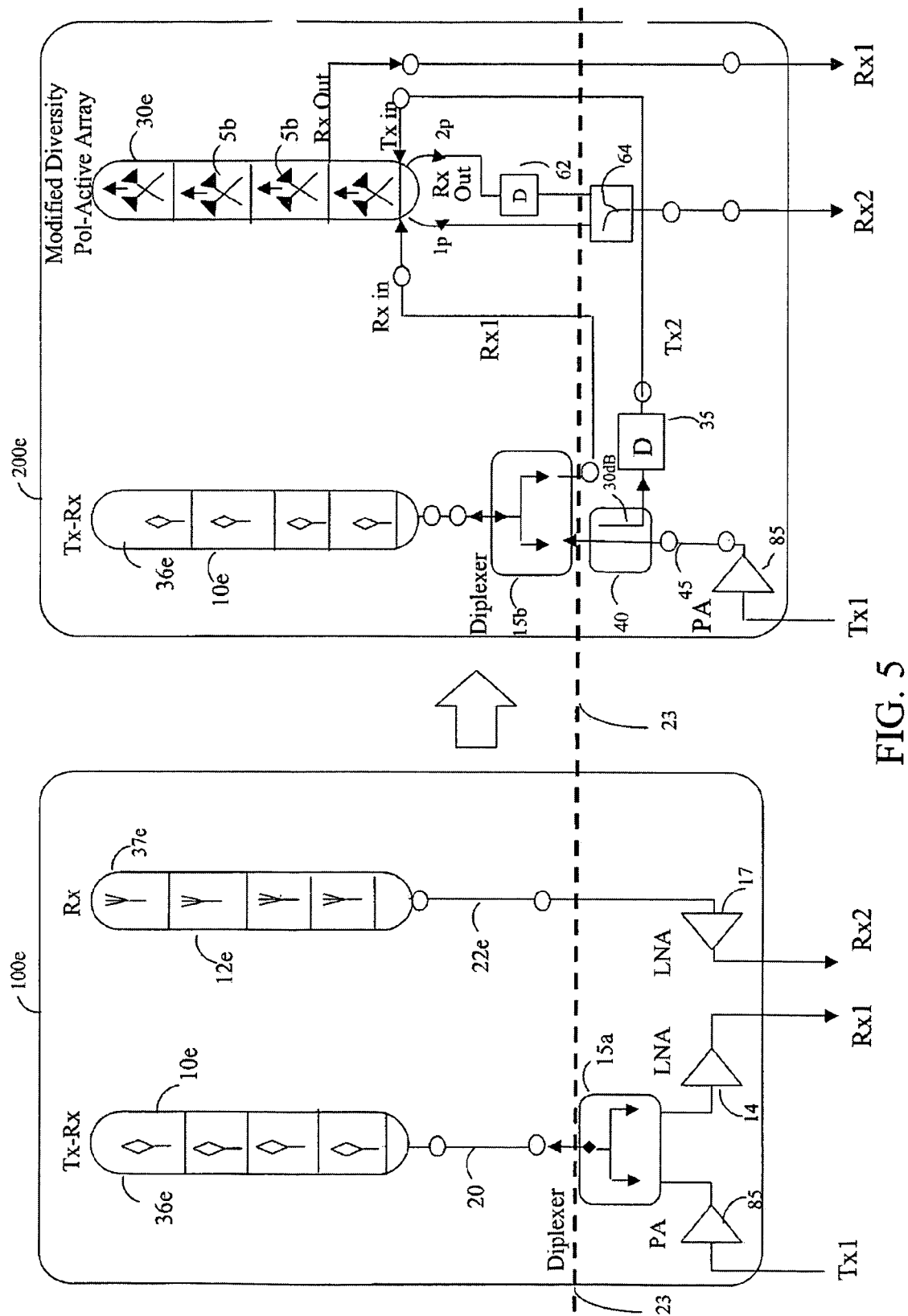
FIG. 5 shows an illustrative augmentation method where an existing antenna arrangement having Rx space diversity configuration is converted to a new antenna arrangement having Tx and Rx space diversity, Tx and Rx time diversity and Rx polarization diversity.
Figure 6:
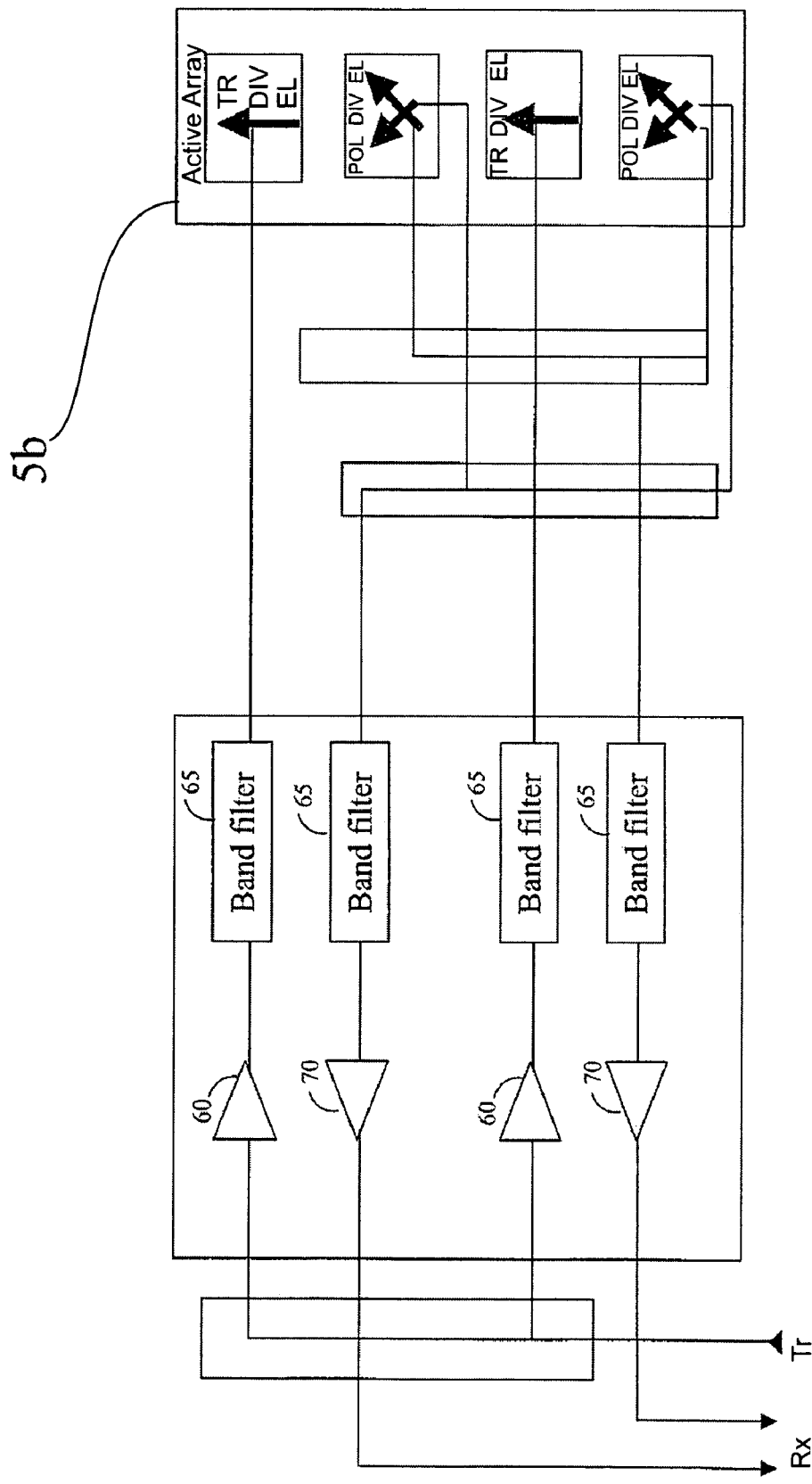
FIG. 6 shows an exemplary embodiment of an active radiator unit incorporated into the embodiments of FIGS. 4 and 5.

Regarding FIG. 5, all of the components of the existing base station antenna arrangement 100e connect in the same manner and operate in the same manner as the components shown in FIG. 1. Thus, the existing base station antenna arrangement 100d of FIG. 4 will not be specifically discussed.

The augmentation method of FIG. 5 involves replacing a secondary antenna array 37e with a new antenna array 30e. Augmentation of the base station 100e of in FIG. 5 converts an existing base station antenna arrangement 100e, having Rx space diversity configuration, to an augmented antenna array 200e having Tx and Rx space diversity, Tx and Rx time diversity and Rx polarization diversity. In FIG. 5, the newly added antenna array 30e may comprise either an active or passive antenna array. FIG. 6 illustrates an exemplary embodiment of an active radiator unit 5b, which may be employed in the active antenna array according to the embodiment of FIG. 5.

To facilitate the various exemplary diversity schemes of FIG. 5, the spacing between the Tx elements of the main antenna array 10e and the Tx elements of the new antenna array 30e provides Tx space diversity. Likewise, the spacing between the Rx elements of the main antenna array 10e and the Rx elements of the new antenna array 30e provides Rx space diversity.

To provide Tx time diversity, a directional coupler 40 serves as a directive feed that couples the main antenna 10e and new antenna array 30e. As the base station transceiver subsystem (not shown) transmits a signal via the transmission cable Tx1 to the transmit elements of the main antenna array 10e, the directional coupler obtains a sample of the transmit signal before the main antenna array 10e radiates the signal along the forward link to a mobile unit (not shown). The directional coupler 40 then sends the sample of the signal to a delay unit 35. The delay unit 35 facilitates transmit time diversity within the augmented antenna array 200e by sending, by way of cable Tx2, at least one or more time-delayed copies of the sample of the signal to the transmit elements of the new antenna array 30e, at connection point Tx In, for broadcasting the copy signal to mobile units.

To implement Rx time diversity, the augmentation method provides within the travel path of received signals a combiner 64 and a delay unit 62 downstream of the main antenna array 10e and the new antenna array 30e. When a mobile unit transmits a signal to the base station transceiver subsystem (not shown), the receive elements of the main antenna array 10e and the new antenna array 30e intercept the receive signals and send the receive signals to the base along the respective reception path of the main antenna array 10e and the new antenna array 30e. The travel path of the cable Rx1 extends from the main antenna array 10e, travels through relocated diplexer 15b and feeds into the new antenna array 30e at connection point Rx In. Once the receive signals enter the new antenna array 30b, the signals may exit through several different routes, e.g., Rx Out (1p) and (2p) and Rx Out. The delay unit 62, within the travel path of the reception lines, collects the receive signals of Rx(1p) and (2p) to perform a diversity analysis on the characteristics of the receive signals. Then, the combiner 64, located within the reception cable Rx2, combines the receive signals and transmits the receive signals to the base station transceiver subsystem (not shown). Alternatively or in conjunction with the reception cables lines of reception cable Rx2, the receive signals may travel from the new antenna array 30e to the base station transceiver subsystem (not shown) via reception cable Rx1.

Furthermore, the polarization diversity configurations of the elements of both the main antenna array 10d and new antenna array 30d provide Rx polarization diversity schemes.

Augmentation of FIG. 5 renders several benefits to the augmented antenna arrangement base station, which are similar to the benefits obtained by FIG. 1. For example, augmentation of the base station adds functionality without requiring any additional amount of space. Another benefit is the incorporation of multiple diversity schemes. For instance, in the exemplary embodiments of the augmented antenna array 200e of FIG. 5, Tx and Rx space diversity, Tx and Rx time diversity and Rx polarization diversity may be achieved. A further benefit is a cost reduction in power consumption and cabling associated with rendering a passive antenna array active.

Augmentation of an existing base station antenna arrangement 100a–e, as shown in FIGS. 1–5 provides several benefits as discussed above, however, the addition of a new antenna array, which is active, to a main antenna array 10a–e may produce nearby, co-located antennas. Namely, the co-located antenna may comprise, for example, a main antenna 10a–e and a new active antenna array 30a–e. Unfortunately, in cases where one or more adjacent-band or tertiary-band transmitter antennas are located-nearby each other, co-location-induced spurious emissions may be generated when each antenna transmits or receives a signal. The level of interference, which may be injected back toward the BTS transmitter, may cause a high level of interference power to be amplified by the transmitter section of the new active antenna array 30a–e and radiated by the active antenna array 30a–e. One scenario that may produce interference, generated from co-location-induced spurious emissions, may occur when the patterns of the signals transmitted from the co-located antennas are relatively too close to each other so that their signals are correlated. In such a case, the transmitter filter, because of its bandwidth, may not be able to provide a sufficient amount of suppression of the undesired spurious emission. This issue becomes a more significant problem especially when the co-located antennas are located on the same rooftop or antenna mast.

Figure 7:
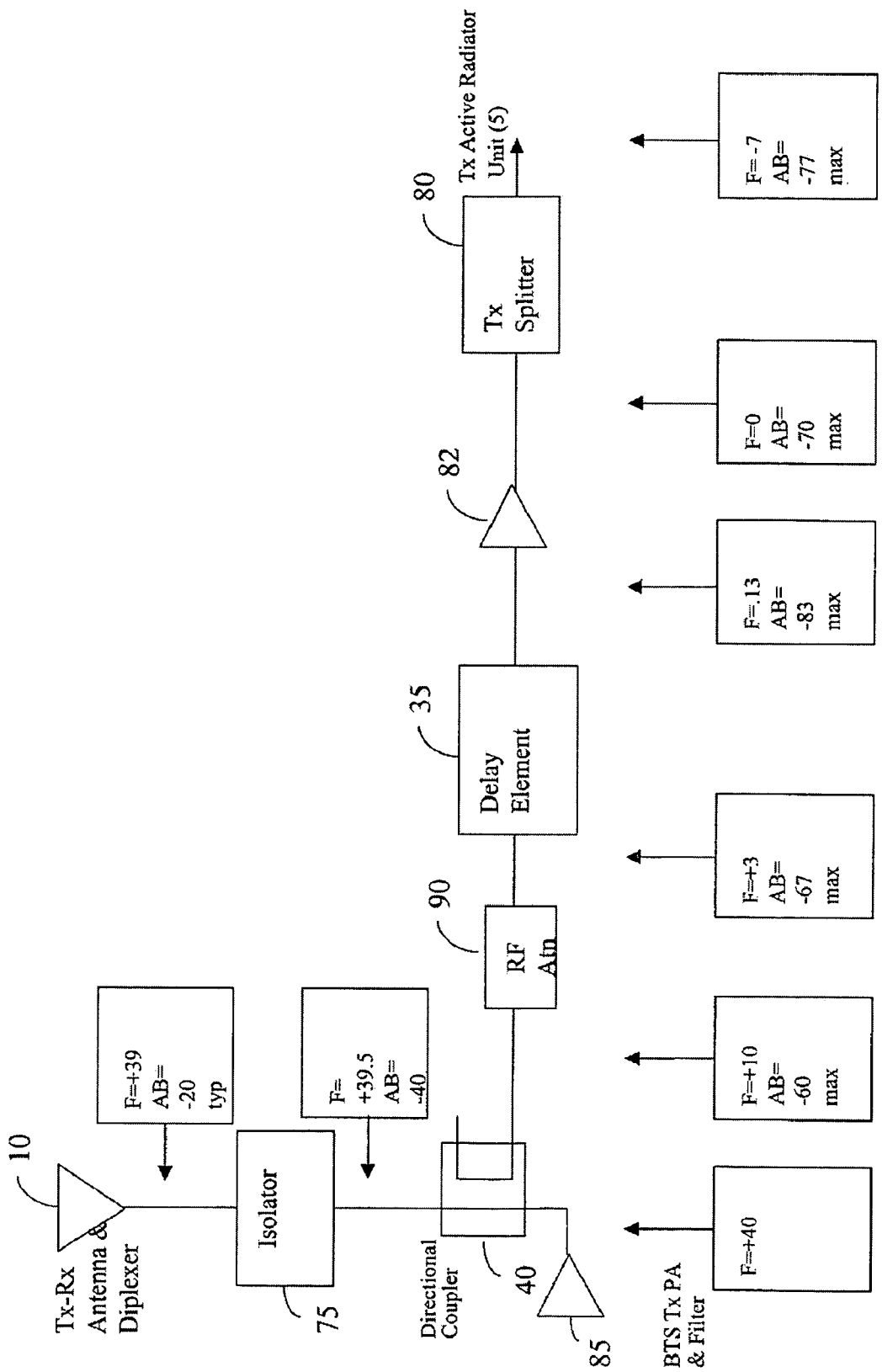
FIG. 7 is a block diagram of an embodiment of the transmit chain according to the present invention.

FIG. 7 shows an embodiment of the invention, which provides a solution to mitigate such spurious emissions and to decorrolate the signals of the co-located antennas. This embodiment augments the architecture of the transmit chain of the embodiments of FIGS. 1–5. In accordance with the embodiment illustrated in FIG. 7, such augmentation involves (a) adding isolator 75 on the mainline output port of the directional coupler 40 and (b) selecting a coupling factor of the directional coupler 40 to maintain the proper relationship between the power of the fundamental signal (F) to be amplified with respect to out-of-band interference "injected" into the augmented antenna array 200a–e. These modifications may help to ensure that the level of spurious emissions amplified and radiated by the transmitter section 50 of the active antenna array 30a–e is not excessive, and in full compliance with FCC, TIA, and other industry and regulatory requirements.

Figure 8:
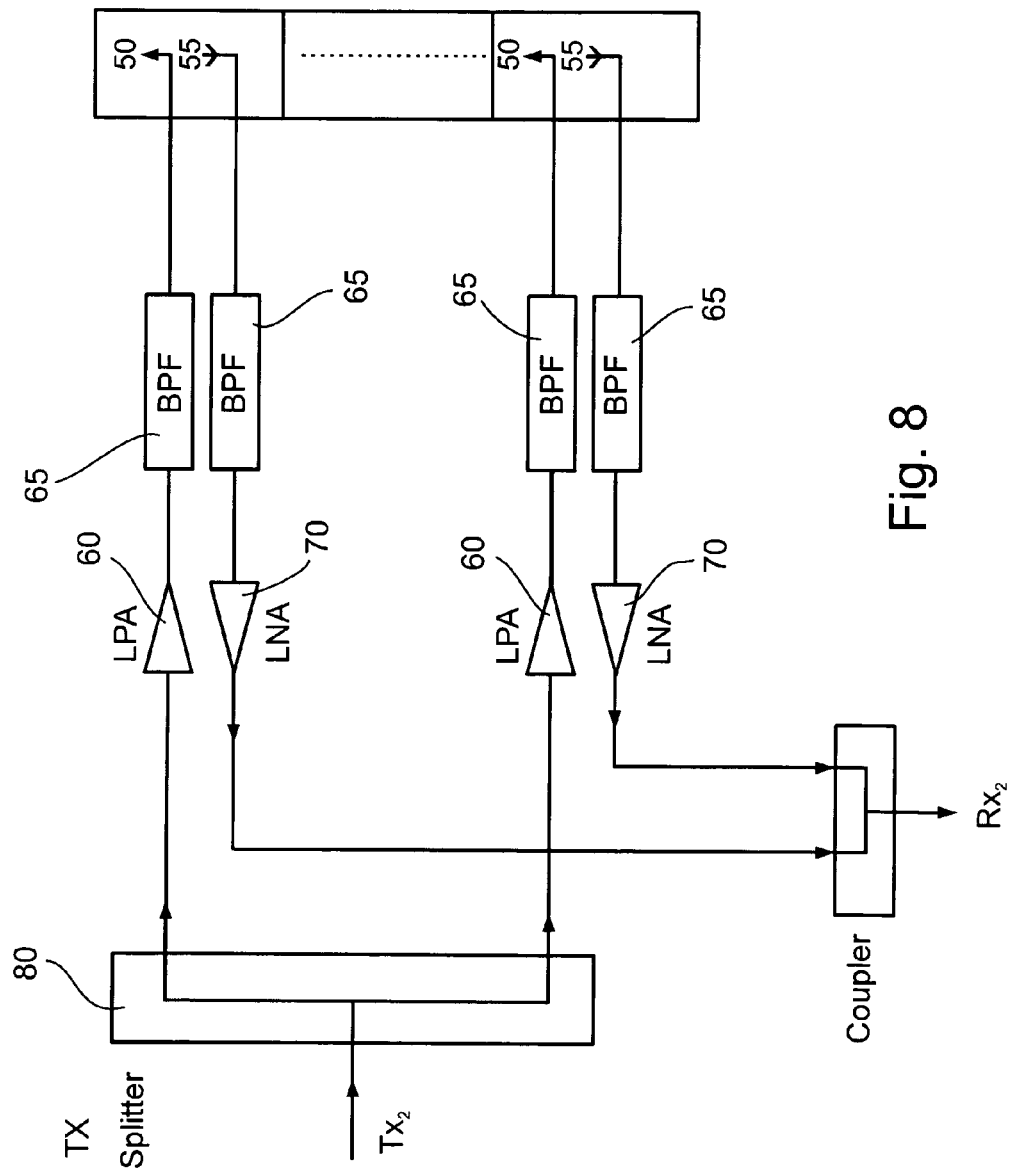
FIG. 8 is a simplified diagram illustrating the connections of the receive and transmit circuitry to the receive and transmit antennas.

Reference is now made to FIG. 8, which is a simplified diagram illustrating connections between receive and transmit circuitry and receive and transmit antennas.

In FIG. 8, linear 50 and polar 55 antenna elements are connected via amplifiers 60 and 70 and band pass filters 65 to transmit 80 and receive circuitry.

This novel solution to combat the co-location-induced transmitter spurious emissions generated in the embodiments of FIGS. 1–5 will be presented by way of example as illustrated in FIGS. 1–7 and described below. The exemplary block diagram, as shown in FIG. 7, reflects examples of final values of fundamental (F) and adjacent-band (AB) signal levels for the scenario described as follows.

(1) Initially, the analysis begins with the assumption that the augmented antenna array 200a–e includes one (or more) PCS operator's transmitter antennas located nearby the transmit-receive (Tx-Rx) as shown in FIGS. 1–5. If at least one of the PCS operator's transmitter frequency operates, e.g., in the band adjacent to the band in which the Tx-Rx antenna operates, significant radio frequency (RF) power at the transmitter frequency employed by the other PCS operator may be injected into the Tx-Rx antenna of the augmented antenna array 200a–e.

(2) In an actual scenario, the actual value of the conducted (measured) power for the adjacent-band of the other PCS operator's signals present at the Tx-Rx antenna terminals may depend on such factors as the Tx-Rx antenna gain, its antenna pattern, and the location and antenna pattern of the transmitter antenna belonging to the other PCS operator. However, for the test case described herein, the analysis assumes that the two transmitter antennas belonging to the two PCS operators include an effective coupling factor of 60 dB (FIG. 7), from one transmitter antenna port to the other transmitter antenna port. A poor coupling assumption for a co-location scenario may fall, for example, in the range of 35 to 45 dB. The 60 dB coupling value may result, e.g., from a vertical separation of the two respective transmitter antennas, installed on the same mast at approximately 3.5 feet apart. Alternatively, the 60 dB coupling factor may result from two respective transmitter antennas mounted on a rooftop with a horizontal spacing of about 40 feet or less, depending on the respective antenna patterns. Given the assumed 60 dB coupling factor and assuming a transmitter conducted per-carrier power of +40 dBm for the other PCS operator, the injected adjacent band per-carrier power present at the antenna port of the Tx-Rx antenna of the augmentation system 200a–e is −20 dBm (FIG. 7).

(3) The adjacent-band per-carrier power present at the mainline output port of the directional coupler 40 of −20 dBm should not, according to FCC rules and TIA requirements, cause an excessive level of spurious emissions at the output of the new active antenna array 30a–e. The FCC and TIA requirement is −13 dBm per 1 MHz (conducted) for all spurious emissions, expressed as a composite power level associated with all the active radiator units 5a or 5b in an active antenna array 30a–e. For example, if there are 4 active radiator units 5a or 5b in the active antenna array 30a–e, the total composite power at the adjacent band (per 1 MHz) is −19 dBm per active antenna array. Furthermore, even if the "injected" signal is not created within the augmented configuration 200a–e, it is still possible that significant power may be generated at the adjacent-band frequency of interest due to the nonlinearity of the LPA 60 in the active radiator unit 5a or 5b.

(4) Next, the analysis adjusts the "injected" signal accordingly to be 10 dB below the FCC/TIA limit, or −29 dBm per active radiator unit 5a or 5b, measured at each active radiator unit output 50. The next supposition of the analysis, assumes that the 1 MHz value of measurement bandwidth represents approximately the same bandwidth as the assumed CDMA signal (1 MHz vs. 1.25 MHz) transmitted by the adjacent-band of the other PCS operator.

(5) Next, the analysis determines the maximum adjacent-band per-carrier power at the input 55 to each active radiator unit 5a or 5b required in order to be FCC and TIA compliant, given the 10 dB value of assumed margin. In other words, the analysis calculates how much additional suppression of the adjacent band signal may be needed to define a solution for mitigating the co-location-induced spurious emissions. For this test scenario, the analysis presumes that there are 4 active radiator units in the active antenna array and that each active radiator unit gain is at 40 dB (appropriate for the multicarrier active radiator unit). Since the adjacent-band signal is −29 dBm at each active radiator unit output 50, as discussed above, the input 55 of the active radiator unit equals −69 dBm. Next, as the signal travels to the transmitter section of the active antenna array 30a–e, a transmitter splitter 80 (FIG. 7) divides the signal among the transmission segments of the 4 active radiator units. The loss in the transmitter splitter 80 becomes approximately 7 dB, and the total interference power at the input to the 4-way splitter equals (−69+7=−62)−62 dBm.

(6) Now, the analysis determines the level of the fundamental signal, which should be provided at the input to the transmitter splitter. If the active antenna array 30a–e uses four 2-watt active radiator units 5a or 5b with four CDMA carriers, each carrier exhibits +33+7−40=0 dBm at the input to the transmitter splitter.

(7) If the delay unit 35 consists of a time delay element (e.g., a SAW device) with, e.g., 16 dB loss followed by an RF amplifier 82, e.g., a WJ AH1 with 13 dB gain and +41 dBm Output IP3, the system needs a fundamental delay unit input signal level of +3 dBm per carrier. The corresponding maximum allowable level of adjacent-band power at the delay unit 35 input becomes −59 dBm. Thus, at the input to the delay unit 35, the relative level of adjacent-band power with respect to one desired transmitter carrier equals −62 dBc.

(8) However, in order to comply with the evolving W-CDMA requirements, it is desirable to reduce the maximum adjacent-band signal level by 8 dB, to −70 dBc. Accordingly, in this scenario, the maximum adjacent-band signal level changes to adopt this assumption. Thus, when the fundamental transmitter input power at the input to the delay unit 35 is +3 dBm per carrier, the new maximum allowable adjacent-band signal level becomes −67 dBm (−70+3=−67).

(9) Another assumption of the analysis is that the BTS transmitter PA 85 (FIGS. 1–5) output power is +40 dBm per carrier, as illustrated in FIG. 7. Given the 30 dB coupling factor of the directional coupler 40, the inclusion of a 7 dB fixed attenuator 90 operates in order to set the desired level of the fundamental transmitter signal to be +3 dBm at the input to the delay unit 35 (FIGS. 1–5 and 7). Alternatively, attenuator 90 may be provided as a component of the delay unit 35.

(10) A further assumption is that the coaxial cable losses in the tower-top portion of the augmentation system are negligible. With the 7-dB delay input attenuation value, this means that the maximum allowable adjacent-band signal at the coupled port of the directional coupler 40 may be −60 dBm. With the assumed −20 dBm adjacent-band signal present at the mainline output port of the directional coupler 40, this requires that the directivity of the directional coupler 40 be such that the level of adjacent-band power appearing at the coupled port is 40 dB lower. Although the 40-dB value is quite attainable, because 40 dB is not a worst-case scenario, the directivity of the directional coupler 40 may be, for example, 25 dB more stringent for some co-location scenarios. Therefore, it is necessary to select an alternative approach for more demanding applications. The solution, as shown in FIG. 7, is to include an isolator 75 with enough isolation to easily meet the requirement for the application of interest. Preferably, the isolator 75 is a ferrite isolator, which passes energy traveling in one direction while absorbing energy from the opposite direction. This solution is also effective where the co-location-induced spurious emissions are due to nearby PCS transmitters which are not adjacent-band.

(11) It is apparent from this analysis that while many co-location applications will not necessarily require an isolator, some applications may benefit from a single-junction isolator while a few others may even be best served by a dual-junction isolator in order to meet FCC and TIA requirements. Each ferrite junction typically provides roughly 20 to 25 dB suppression (in the "reverse" direction) for the adjacent-band signals.

(12) According to the preferred embodiment, the invention includes a ferrite isolator that possesses low internal intermodulation distortion, at the RF power levels of interest.

(13) For microcell applications where the transmitter power associated with the BTS transmitter power amplifier (PA) (and Tx-Rx antenna) is below 2 watts per carrier, it may be necessary to reduce the coupling value below the 30 dB value discussed above. The need to employ a lower coupling value may depend on the level of challenges associated with the co-location environment. For example, if there is a significant co-location issue, a coupling factor of 20 dB may be employed for transmitter per-carrier power values of +23 to +33 dB per carrier, taking care to also use an appropriate ferrite isolator. Alternatively, for power values of +23 to +33 dBm per carrier if there is no co-location issue, the 30 dB coupler may be employed with a delay unit 35 which offers higher RF gain than previously discussed.

(14) Although in an alternative embodiment, an RF bandpass filter with a notch response could potentially be used to provide attenuation of the adjacent-band and other PCS signals, a ferrite isolator is most likely to cost less, and it has less associated loss to reduce the transmitter power reaching the Tx-Rx antenna. Since the previously discussed higher incremental EIRP, which results from the addition of the active antenna array 30a–e, will more than compensate for the isolator loss, the loss due to the ferrite isolator 75 should not be problematic.

Alternatively, some augmentation applications may employ a delay element 35 comprising an optical fiber cable, for example, an optical delay unit. Such an embodiment envisions that an E/O interface transducer such as a laser diode may drive a section of the optical fiber cable, which in turn will drive an O/E interface transducer or optical receiver. A value for the total RF gain of this cascade of devices is typically 0 dB. However, the assumed signal power value of +3 dBm per carrier for the test scenario discussed above may be excessive. A more likely signal power value is, for example, in the range of −20 dBm per carrier. In order to ensure compliance with all relevant FCC and TIA requirements, it is important to consider the dynamic range of the transmit chain of the augmented system (200a–e) including the optical delay unit 35 and active radiator units 5a or 5b.

In general, the addition of a ferrite isolator to the augmented system (200a–e) helps to ensure that FCC and/or TIA spurious emissions limits will not be exceeded.

If, in the future, additional PCS operators co-locate their antennas nearby, in accordance with the embodiment disclosed herein, a ferrite isolator (and optionally appropriate RF filters) may be included at the time of the augmentation system.

For cellular band augmentation systems where AMPS carriers and/or iDEN 900 MHz systems are present at the same antenna site, this solution (along with possible use of additional bandpass and bandpass/notch filters) should deliver improved system performance, while ensuring compliance with FCC and TIA requirements.

Furthermore, in addition to the benefits, specifically discussed above regarding FIGS. 1–5, the following additional benefits may be achieved by some or all of the embodiments disclosed in FIGS. 1–5. For example, based upon the cost/assets trade-offs listed below, the cost of installing an active antenna array using active radiator units 5a or 5b (by either the addition or replacement method) is comparable to merely installing a pair of amplifiers into an existing base station. However, adding an active antenna array using active radiator units 5a or 5b can achieve several additional advantages, which are as follows.

Cost/Assets Trade-Off:

| | |
|---|---|
| Adding LNAs on both antennas | 2 × LNAs |
| | 1 alarm box |
| Adding Active antenna array | 1 × active radiator unit |
| | (the diversity antenna) |
| | ⅓ × ICU |
| | 3 thin cables |
| | one thick cable |

For example, the replacement of the conventional diversity antenna in FIGS. 1 and 5 with the new active antenna array provides several benefits to the sector when the active antenna array 5a, 5b achieves the same gain and EIRP as the main antenna. For instance, the following benefits may be achieved:

| | Reverse link | Forward link |
|---|---|---|
| LNA (space div.) | +3 dB | |
| Polarization + space div | +2 dB | |
| Active radiator unit EIRP | | +3 dB |
| Transmitter diversity | | +3 dB |
| Total | +5 dB | +6 dB |

Furthermore, the incorporation of transmit diversity to the PCS (and/or cellular) base stations, which results from the installation of the active antenna array 30a–e, as shown in FIGS. 1–5, generates an additional benefit of forward link margin and reverse link diversity capabilities to existing cellular base stations.

While the invention has been described with reference to the certain illustrated embodiments, the words which have been used herein are words of description, rather than words of limitation. Changes may be made, within the purview of the appended claims, without departing from the scope and the spirit of the invention in its broader aspects. Although the invention has been described herein with reference to particular structures, materials, and embodiments, such as within the scope of the appended claims.

What is claimed is:

1. A method for augmenting an existing base station, said existing base station including a main antenna array having transmit and receive elements and a diversity antenna array having receive elements, said existing base station thereby providing receive diversity, said method comprising:
    replacing said diversity antenna array with a new diversity antenna array comprising both receive and transmit elements, said replacing being to augment said existing base station to provide both transmit and receive diversity; and
    adding a time delay to a transmitter section of said new diversity antenna array to feed a time-delayed sample to said new diversity antenna array, said time-delayed sample being of a signal transmitted by said main antenna array.

2. A method for augmenting an existing base station, said existing base station including a main antenna array, which comprises both transmit and receive antenna elements, and a diversity antenna array, which comprises passive receive elements, said existing base station thereby providing receive diversity, said method comprising:
    replacing said diversity antenna array with a new diversity antenna array comprising both receive and transmit elements, thereby to augment said base station to provide both transmit and receive diversity,
    co-locating said receive and transmit elements at the top of a building to form one common array;
    coupling a directional coupler to said main antenna array and to said new diversity antenna array, to sample a transmit signal emitted from said main antenna array; and
    connecting an isolator to said main antenna array, in order to control spurious emissions emitted from said base station.

3. A method augmenting an existing base station augmentation according to claim 2, wherein said main antenna and said new diversity antenna are co-located.

4. A method of augmenting an existing base station augmentation according to claim 2, further including,
    connecting a delay unit to a transmit port of said new diversity antenna array to feed a time-delays sample to said new diversity antenna array, said time-delayed sample being of a signal transmitted by said main antenna.

5. A method of augmenting an existing base station according to claim 2, wherein said isolator is a ferrite isolator.

6. A method of augmenting an existing base station according to claim 5, wherein said ferrite isolator possesses low internal intermodulation distortion.

7. An existing base station augmentation method according to claim 2, further including:
    locating said directional coupling at the top of said building.

* * * * *